US012811305B2

(12) United States Patent
Vassos et al.

(10) Patent No.: US 12,811,305 B2
(45) Date of Patent: Nov. 24, 2026

(54) MULTI-FUNCTION MICRO-ACTUATED METASURFACE

(71) Applicant: THE UNIVERSITY OF BIRMINGHAM, Birmingham (GB)

(72) Inventors: Evangelos Vassos, Birmingham (GB); Alexandros Feresidis, Birmingham (GB); James Churm, Birmingham (GB)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 61 days.

(21) Appl. No.: 18/848,420

(22) PCT Filed: Mar. 20, 2023

(86) PCT No.: PCT/GB2023/050683
§ 371 (c)(1),
(2) Date: Sep. 18, 2024

(87) PCT Pub. No.: WO2023/187322
PCT Pub. Date: Oct. 5, 2023

(65) Prior Publication Data

US 2025/0210879 A1 Jun. 26, 2025

(30) Foreign Application Priority Data

Mar. 28, 2022 (GB) ...................................... 2204389

(51) Int. Cl.
*H01Q 15/00* (2006.01)
*H01Q 15/14* (2006.01)
*H01Q 15/24* (2006.01)

(52) U.S. Cl.
CPC ......... *H01Q 15/148* (2013.01); *H01Q 15/244* (2013.01)

(58) Field of Classification Search
CPC ...... H01Q 15/00; H01Q 15/002; H01Q 15/14; H01Q 15/148; H01Q 15/24; H01Q 15/244;
(Continued)

(56) References Cited

U.S. PATENT DOCUMENTS 7,307,589 B1 * 12/2007 Gregoire ................ H01Q 1/248 343/700 MS
7,623,087 B2 * 11/2009 Higaki ................. H01Q 15/008 343/702
(Continued)

FOREIGN PATENT DOCUMENTS

CN 102769198 A 11/2012
CN 102683859 B 3/2015
(Continued)

OTHER PUBLICATIONS

Rabbani et al. (2021). Electro-Mechanically Tunable Meta-Surfaces for Beam-Steered Antennas from mm-Wave to THz. Proceedings of the 50th European Microwave Conference (EuMC), 416-419.
(Continued)

*Primary Examiner* — Tho G Phan
(74) *Attorney, Agent, or Firm* — Caesar Rivise, PC

(57) ABSTRACT

There is disclosed a reconfigurable metasurface device comprising a planar dielectric substrate and a two dimensional array of substantially planar conductive elements formed on or in the dielectric substrate. The two dimensional array of substantially planar conductive elements consists of alternating rows and columns of first and second substantially planar conductive elements, the first conductive elements each having a first shape with a first width and height, and the second conductive elements each having a second shape with a second width and height. The alternating rows and columns are offset with respect to each other such that centroids of the first shapes are disposed centrally between
(Continued)

centroids of the second shapes of each adjacent row, and centroids of the first shapes of one column are disposed centrally between centroids of the second shapes in each adjacent column. The device further comprises a conductive ground plane disposed adjacent and substantially parallel to the two dimensional array of conductive elements so as to define an air gap between the two dimensional array of conductive elements and the conductive ground plane, and a micro-actuator configured to adjust or vary a thickness of the air gap.

18 Claims, 13 Drawing Sheets

(58) Field of Classification Search
CPC .. H01Q 15/248; H01Q 13/20; H01Q 15/0086; H01Q 3/16; H01Q 1/52; H01Q 1/38
See application file for complete search history.

(56) References Cited

U.S. PATENT DOCUMENTS

| | | | | |
|---|---|---|---|---|
| 9,450,310 | B2 * | 9/2016 | Bily | H01Q 15/0006 |
| 10,734,736 | B1 * | 8/2020 | McCandless | H01Q 19/067 |
| 11,217,896 | B2 * | 1/2022 | Legay | H01Q 5/28 |
| 12,142,832 | B2 * | 11/2024 | Chazelas | H01Q 3/247 |
| 12,476,379 | B1 * | 11/2025 | Khushrushahi | H01Q 15/0026 |
| 2015/0022409 | A1 | 1/2015 | Milroy et al. | |

FOREIGN PATENT DOCUMENTS

| | | | |
|---|---|---|---|
| CN | 109216932 | A | 1/2019 |
| CN | 110034406 | A | 7/2019 |
| CN | 109004370 | B | 8/2020 |
| CN | 113708075 | A | 11/2021 |
| CN | 114069232 | A | 2/2022 |
| WO | 2014011119 | A1 | 1/2014 |

OTHER PUBLICATIONS

Sivasamy et al. (2019). Design and fabrication of flexible FSS polarizer. Int J RF Microw Comput Aided Eng. XP 72010513.
Vassos et al. (2020). Ultra-low-loss tunable piezoelectric-actuated metasurfaces achieving 360 or 180 dynamic phase shift at millimeter-waves. Scientific Reports, 10(1), XP 093048629.
International Search Report from corresponding PCT/GB2023/050683 mailed Jun. 5, 2023.
English Abstract for CN 102769198 A (2012).
English Abstract for CN 102683859 B (2015).
English Abstract for CN 109216932 A (2019).
English Abstract for CN 110034406 A (2019).
English Abstract for CN 109004370 A (2020).
English Abstract for CN 113708075 A (2021).
English Abstract for CN 114069232 A (2022).
Search Report from counterpart GB Patent Application No. 2204389.7 mailed Sep. 23, 2022.

* cited by examiner

MULTI-FUNCTION MICRO-ACTUATED METASURFACE

CROSS-REFERENCE TO RELATED APPLICATIONS

This application is a U.S. National Phase Application of PCT/GB2023/050683, filed Mar. 20, 2023, which claims priority to GB 2204389.7, filed Mar. 28, 2022, the contents of which applications are incorporated herein by reference in their entireties for all purposes.

FIELD OF THE INVENTION

This invention relates to a device comprising a metasurface configured to control a phase and/or a polarization of an incident electromagnetic wave.

BACKGROUND

The development of metasurfaces is a technological breakthrough that has grown rapidly in recent years, enabling the evolution of improved communication systems.

A metasurface, in the context of the present disclosure, is a thin sheet of material (of thickness less than the wavelength of the RF signals modulated by the metasurface) having a periodic array of scattering elements whose dimensions and periods are small compared with the operating wavelength. A typical metasurface may comprise a thin dielectric substrate of thickness <1 mm with a two dimensional array of conductive metal elements printed, etched or micromachined on the substrate, the conductive elements having a size of the order of millimetres.

Metasurfaces are typically low profile structures that have the ability to manipulate an incident electromagnetic wave, for example a radio frequency (RF) signal. Metasurfaces may find applications in controlling a polarization state of a structure, propagating mode to surface mode conversion, anomalous reflection, reflectarray antennas, transmit array antennas, absorbers, high impedance surface based antennas, and reflectors, among other applications. An additional advantage of metasurfaces is that, depending on design and fabrication, they can be used from millimetre-wave (mm-wave) frequencies (typically 30 GHz to 300 GHz) up to the THz regime or even beyond into the infrared spectrum.

Another key factor that adds value to metasurfaces is that, by applying a tuning mechanism, it is possible further to control an impinging electromagnetic wave. This additional degree of freedom can be obtained by applying one of the following mechanisms: ferroelectric substrates, liquid crystals, phase change materials such as vanadium dioxide, graphene, diodes, microelectromechanical systems (MEMS) and more recently piezoelectric actuators (PEAs). The choice of tuning mechanism may be determined by a particular application. Basic parameters that need to be considered when selecting an appropriate tuning mechanism include: the frequency of operation, loss tolerance, switching/tuning speed, ease of integration, form factor, cost etc.

In the case of applications where polarization control of the impinging electromagnetic wave is required, it is important to pay attention to the phase control of the two orthogonal components of the electromagnetic wave, the low losses, the low profile, and a satisfactory operating range. Especially with regard to satellite communications, control of polarization is important in order to minimize or counter the effect of Faraday rotation caused by the ionosphere. In addition, it would be desirable to create a structure that enables alternations between different polarization states without the use of multiple antennas, since this can lead to a substantial reduction in satellite costs.

BRIEF SUMMARY OF THE DISCLOSURE

Viewed from one aspect, there is provided a reconfigurable metasurface device comprising:

- a planar dielectric substrate and a two dimensional array of substantially planar conductive elements formed on or in the dielectric substrate, wherein the two dimensional array of substantially planar conductive elements consists of alternating rows and columns of first and second substantially planar conductive elements, the first conductive elements each having a first shape with a first width and height, and the second conductive elements each having a second shape with a second width and height, the alternating rows and columns being offset with respect to each other such that centroids of the first shapes are disposed centrally between centroids of the second shapes of each adjacent row, and centroids of the first shapes of one column are disposed centrally between centroids of the second shapes in each adjacent column;
- a conductive ground plane disposed adjacent and substantially parallel to the two dimensional array of conductive elements so as to define an air gap between the two dimensional array of conductive elements and the conductive ground plane; and
- a micro-actuator configured to adjust or vary a thickness of the air gap.

The first and second shapes may be geometrically similar (i.e. the same shape, but different sizes), or may be geometrically different. The first width and height (of the first shapes) is different to the second width and height (of the second shapes). The first width may be the same as the first height, and the second width may be the same as the second height. The first and/or second shapes may be polygons. The first and/or second shapes may be cross shapes. The first and/or second shapes may be "+" shapes. The first shapes may be one of polygons, cross shapes and "+" shapes, and the second shapes may be a different one of polygons, cross shapes and "+" shapes.

The first and second conductive elements may all be substantially coplanar. Alternatively, the first conductive elements may be disposed in a first plane and the second conductive elements may be disposed in a second, substantially parallel plane adjacent to the first plane.

The first width and height may be designated $h_1$ and the second width and height may be designated $h_2$. In some embodiments, $h_1>h_2$. This is in order to control or change the polarization of an incident electromagnetic wave.

Centroids of the respective first and second shapes may be arranged in a substantially triangular lattice array pattern. A unit cell of the triangular lattice array pattern may be defined by taking a centroid of a first conductive element as an apex, and centroids of the two closest (in an adjacent row or column) second conductive elements as first and second base vertices. The unit cell of the triangular lattice array pattern is an isosceles triangle. Where $h_1>h_2$, a periodicity (distance between centroids) of the first conductive elements in their respective rows and columns is greater than a periodicity of the second conductive elements in their respective rows and columns. Accordingly, the unit cell of the triangular lattice array pattern will be an isosceles triangle with an obtuse apex angle.

In one embodiment, the first conductive elements have a "+" shape with arms of length $l_1$ and width w, and the second conductive elements have a "+" shape with arms of length $l_2$ and width w. The alternating rows and columns are offset with respect to each other such that vertical arms of the "+" shapes of one row are disposed centrally between vertical arms of the "+" shapes of each adjacent row, and horizontal arms of the "+" shapes of one column are disposed centrally between horizontal arms of the "+" shapes of each adjacent column.

The "+" shapes of the first and second conductive elements in the two dimensional array are disposed with their vertical and horizontal arms all substantially parallel to a plane of the dielectric substrate. The first and second conductive elements may all be substantially coplanar. Alternatively, the first conductive elements may be disposed in a first plane and the second conductive elements may be disposed in a second, substantially parallel plane adjacent to the first plane.

The lengths $l_1$ and $l_2$ are different from each other. Length $l_1$ may be greater than length $l_2$. This is in order to control or change the polarization of an incident electromagnetic wave.

Centre points of the respective "+" shapes may be arranged in a substantially triangular lattice array pattern. A unit cell of the triangular lattice array pattern may be defined by taking a centre point of a first conductive element as an apex, and centre points of the two closest (in an adjacent row or column) second conductive elements as first and second base vertices. The unit cell of the triangular lattice array pattern is an isosceles triangle. Where $l_1>l_2$, a periodicity (distance between centre points of the "+" shapes) of the first conductive elements in their respective rows and columns is greater than a periodicity of the second conductive elements in their respective rows and columns. Accordingly, the unit cell of the triangular lattice array pattern will be an isosceles triangle with an obtuse apex angle.

The dielectric substrate may be a printed circuit board (PCB) substrate such as Duroid, FR4 or the like. The thickness of the dielectric substrate and/or the dielectric constant of the dielectric substrate may be chosen for best performance at different frequencies of incident electromagnetic wave. In one particular example, the dielectric substrate may have a thickness no more than 1 mm, for example around 0.8 mm, for example 0.78 mm. However, depending on the frequency of the incident electromagnetic wave, the thickness may range from around 100 μm to around 5 mm or 10 mm. The dielectric substrate may have a dielectric constant εr greater than 2, optionally about 2.3. However, depending on the frequency of the incident electromagnetic wave, the dielectric constant may be in a range of $1<\varepsilon_r<10$. Preferably, the dielectric substrate has a low loss tangent, for example <0.03.

The conductive elements may be formed by printing, etching, laser direct structuring or other suitable process. The conductive elements may be formed on a planar surface of the dielectric substrate, or may be sandwiched between opposing planar surfaces of the dielectric substrate. The conductive elements may be formed from metal, for example copper, although other metals may be used as appropriate. The conductive elements may have a thickness of no more than 0.05 mm.

In an exemplary embodiment, $l_1$=0.85 mm, $l_2$=0.75 mm and w=0.30 mm. The "+" shapes of the first conductive elements, with arms of length $l_1$, may be arranged with a periodicity (distance between centre points of the "+" shapes) of 2.75 mm. The "+" shapes of the second conductive elements, with arms of length $l_2$, may be arranged with a periodicity of 2.35 mm. However, as noted above, the precise values of the various dimensions will depend on the frequency of the electromagnetic waves that are to be controlled by the metasurface, and hence these specific examples are not intended to be limiting, but merely illustrative.

The present inventors are not aware of any prior art metasurfaces that can provide full control of polarization, whether this be circular polarization or linear polarization. Polarization converters are generally considered to be key components for millimetre wave frequency systems, as well as for sensors and remote environmental monitoring applications.

Embodiments of the present disclosure provide a novel reconfigurable metasurface device that can control the phase of an electromagnetic incident wave. Alternatively or additionally, embodiments of the present disclosure provide a novel reconfigurable metasurface device that can control the polarization of an electromagnetic incident wave. The metasurface is positioned adjacent and substantially parallel to a conductive ground plane so as to define an air gap between the two dimensional array of conductive elements and the ground plane. An incident electromagnetic wave of the appropriate frequency will produce a resonance in the air gap and the generation of strong current in the conductive elements of the metasurface and the conductive ground plane. Introducing a tuning mechanism adds an extra degree of freedom to controlling the reflection response. A tuning mechanism is provided in the form of a micro-actuator configured to adjust or vary a thickness of the air gap between the two dimensional array of conductive elements and the conductive ground plane. The micro-actuator may be a piezoelectric actuator. The micro-actuator may be disposed under the conductive ground plane, on the side facing away from the metasurface. Based on the properties of the micro-actuator mechanism, the position of the ground plane can be precisely controlled in the microsecond domain. This allows control of the electromagnetic wave resonance, and thus allows precise control of the phase. In cases where the incidence of the electromagnetic wave is polarized at 45° with respect to the y axis (x and y axes in the plane of the metasurface, z axis orthogonal to the plane of the metasurface), it is possible to control orthogonal components of the incident electromagnetic wave by appropriate design of the two dimensional array geometry. As a result, it is possible to convert linear polarization of the incident electromagnetic wave into a circular polarization at any direction, or to twist the linear polarization by up to 180° in either direction. It is possible to maintain linear polarization or twist the linear polarization by any desired amount by appropriately designing the shape and configuration of the metasurface. Maximum reflection power is obtained when the linear polarization is maintained or twisted by 90°. Other amounts of twist will introduce a loss of power, which in extreme cases can be less than half the incident power if losses due to the metasurface materials are included. However, such power loss may be acceptable in many applications.

The micro-actuator may vary the thickness of the air gap by moving the conductive ground plane relative to the metasurface, or by moving the metasurface relative to the ground plane. Preferably, the micro-actuator is disposed on or connected to a surface of the conductive ground plane facing away from the metasurface. This means that the micro-actuator does not obstruct any part of the air gap. In addition, the conductive ground plane may be thinner and/or lighter than the metasurface, and can therefore be moved more efficiently.

The micro-actuator may be a piezoelectric actuator. The piezoelectric actuator may expand or contract in response to a biasing DC voltage. This allows the thickness of the air gap to be precisely and dynamically controlled by varying the biasing DC voltage.

The micro-actuator may be any other type of fast switching micro-actuator, including but not limited to solenoid actuators, electroactive polymer actuators, microelectromechanical systems, magnetic drive actuators or micromotors.

The conductive ground plane may be mounted on or connected to the micro-actuator so that the micro-actuator can move the conductive ground plane relative to the metasurface, thereby controllably to adjust the thickness of the air gap. Alternatively, the metasurface may be mounted on or connected to the micro-actuator so that the micro-actuator can move the metasurface relative to the conductive ground plane, thereby controllably to adjust the thickness of the air gap.

BRIEF DESCRIPTION OF THE DRAWINGS

Embodiments of the invention are further described hereinafter with reference to the accompanying drawings, in which.

DETAILED DESCRIPTION

Figure 1:
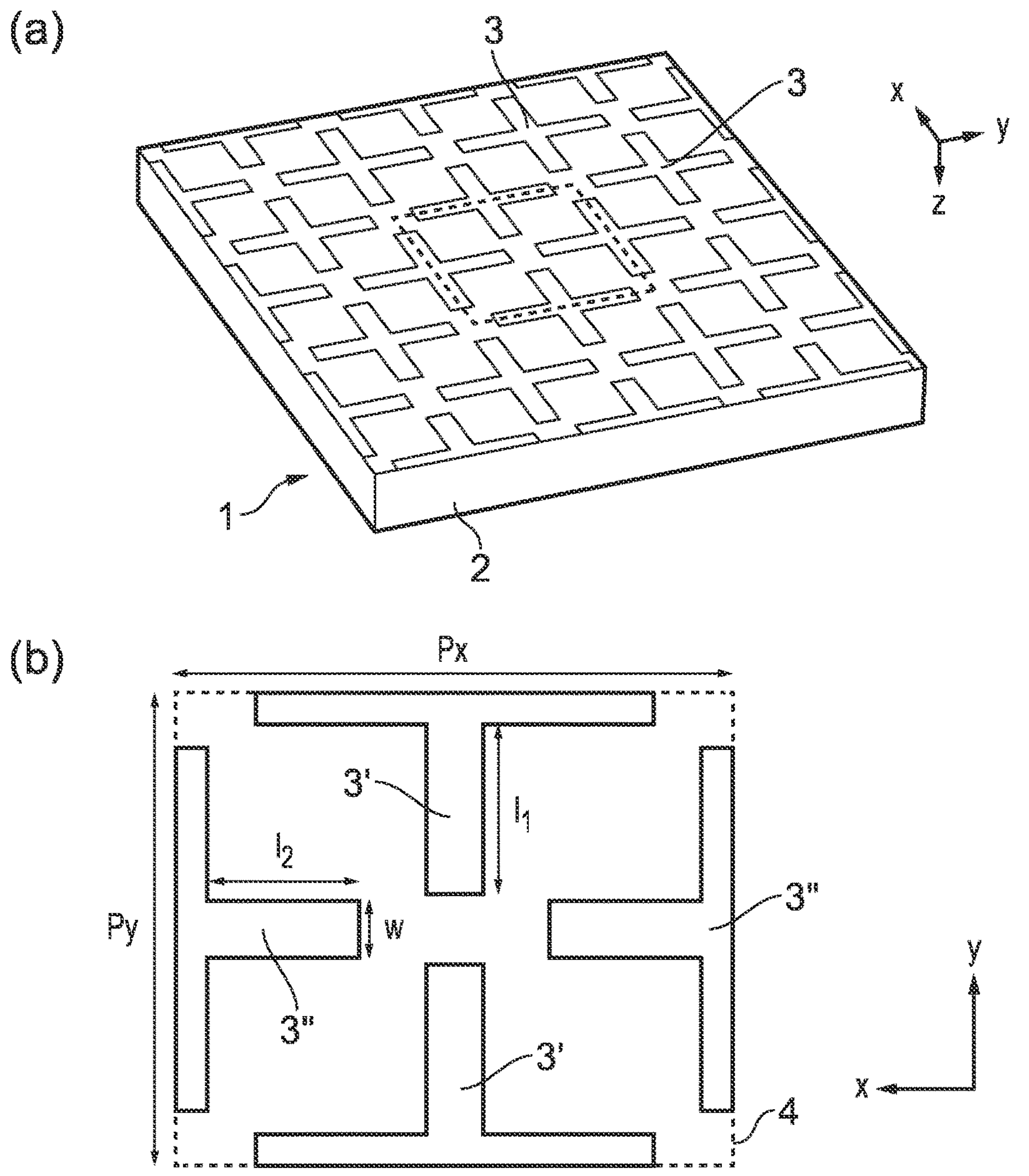
FIG. 1 shows a metasurface of the present disclosure.

FIGS. 1(*a*) and 1(*b*) shows a metasurface (periodic surface) 1 comprising a planar dielectric substrate 2 with a two dimensional periodic array of cross-shaped conductive metal elements 3 formed on an upper surface of the dielectric substrate 2.

The two dimensional array of conductive elements 3 consists of alternating rows and columns of first and second conductive elements, the first conductive elements 3' having a "+" shape with arms of length $l_1$ and width w, and the second conductive elements 3" having a "+" shape with arms of length $l_2$ and width w. The alternating rows and columns are offset with respect to each other such that vertical arms of the "+" shapes of one row are disposed centrally between vertical arms of the "+" shapes of each adjacent row, and horizontal arms of the "+" shapes of one column are disposed centrally between horizontal arms of the "+" shapes of each adjacent column.

Centre points or centroids of the respective "+" shapes 3 are arranged in a substantially triangular lattice array pattern, unit cells of the triangular lattice array pattern being obtuse isosceles triangles each with an apex at a centroid of one of the first conductive elements, and centroids of the two closest (in an adjacent row or column) second conductive elements as first and second base vertices.

In the embodiment of FIGS. 1(*a*) and 1(*b*), $l_1$=0.85 mm, $l_2$=0.75 mm and w=0.30 mm. The "+" shapes of the first conductive elements 3', with arms of length $l_1$, are arranged with a periodicity (distance between centre points of the "+" shapes) of 2.75 mm. The "+" shapes of the second conductive elements 3", with arms of length $l_2$, are arranged with a periodicity of 2.35 mm.

The two dimensional array of conductive elements 3 on the metasurface 1 thus defines a plurality of tessellating unit cells 4, as shown in FIG. 1(*b*). Due to the properties of the metasurface 1, the whole structure can be studied simply by simulating the unit cell 4. Accordingly, the unit cell 4 was analysed in CST Microwave Studio, using periodic boundary conditions to simulate the behaviour of the overall periodic structure.

Figure 2:
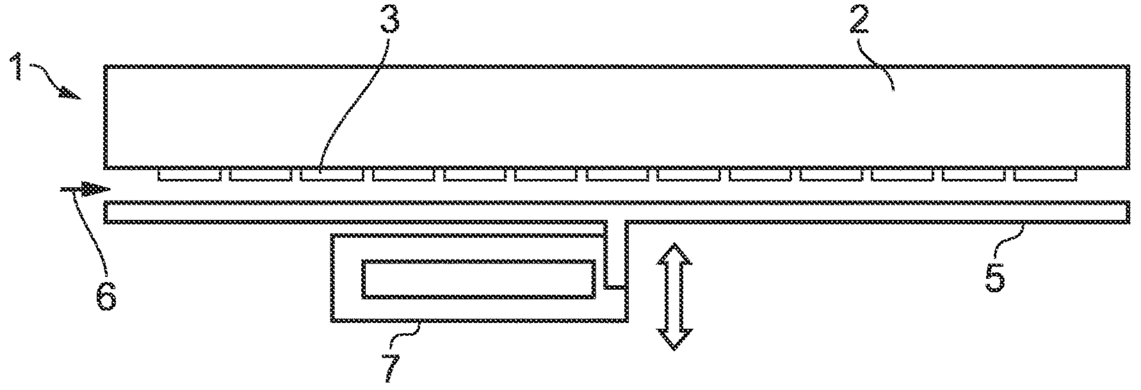
FIG. 2 shows the metasurface of FIG. 1 mounted above a ground plane.

FIG. 2 shows an implementation of the metasurface 1 of FIG. 1(*a*), disposed upside down over a conductive ground plane 5 such that an air gap 6 is defined between the two dimensional array of conductive elements 3 and the conductive ground plane 5. The conductive ground plane 5 is mounted on a piezoelectric actuator 7 such that expansion or contraction of the piezoelectric actuator 7 in response to an adjustable DC biasing voltage causes the conductive ground plane 5 to move up or down, thus varying the thickness of the air gap 6.

The effect of the piezoelectric actuator 7 was inserted in the simulated model as a movable ground plane 5, without the presence of the actuator 7, because the piezoelectric actuator 7 is placed below the ground plane 5 and does not have any additional influence on an incident electromagnetic wave beyond the movement of the ground plane 5.

The orthogonal shape of the unit cell 4, in combination with the triangular lattice symmetry, creates the conditions for the required control of the phase of the two orthogonal components of the incident electromagnetic wave by moving the ground plane 5 and thus varying the thickness of the air gap 6. By selecting an appropriate thickness for the air gap 6, it is possible to apply an appropriate phase shift to the orthogonal components of the incident electromagnetic wave such that the resultant phase difference allows linear polarization to be converted to the desired polarization. In addition, it should be noted that it is desirable that any losses introduced by the arrangement of FIG. 2 should affect both orthogonal components of the electromagnetic wave by the same level. Different losses could prevent complete conversion or twist of the polarization state.

In order to extract the results regarding the reflected polarization, the orthogonal components of the incident electromagnetic wave were studied independently, so as to simulate an inclination $\xi$ of 45° with respect to the y-axis. The simulated results suggest that a conversion from linear polarization to circular polarization can be made, as well as a 90° twist of the linear polarization of the electromagnetic wave by moving the ground plane 5. It should be noted that different frequencies may require different displacements between the two dimensional array of conductive elements 3 and the ground plane 5 in order to achieve conversion to the required polarization states.

Polarization Twist:

A first study was conducted in relation to inversion of the polarization by 90°, and it was observed that for an air gap 6 thickness of around 0.2 mm to 0.35 mm there is a dynamic reversal of the polarization for an incident electromagnetic wave, with angle of incidence ξ=45° with respect to y-axis. In addition, both components of the incident electromagnetic wave were studied separately, in order to confirm the phase difference between them, which should be 180°, as well as losses caused by the structure. The results are shown in FIGS. 3(*a*) to 3(*d*), from which it is apparent that a significant degree of polarization reversal has been achieved, which is satisfactory for most applications.

Figure 3:
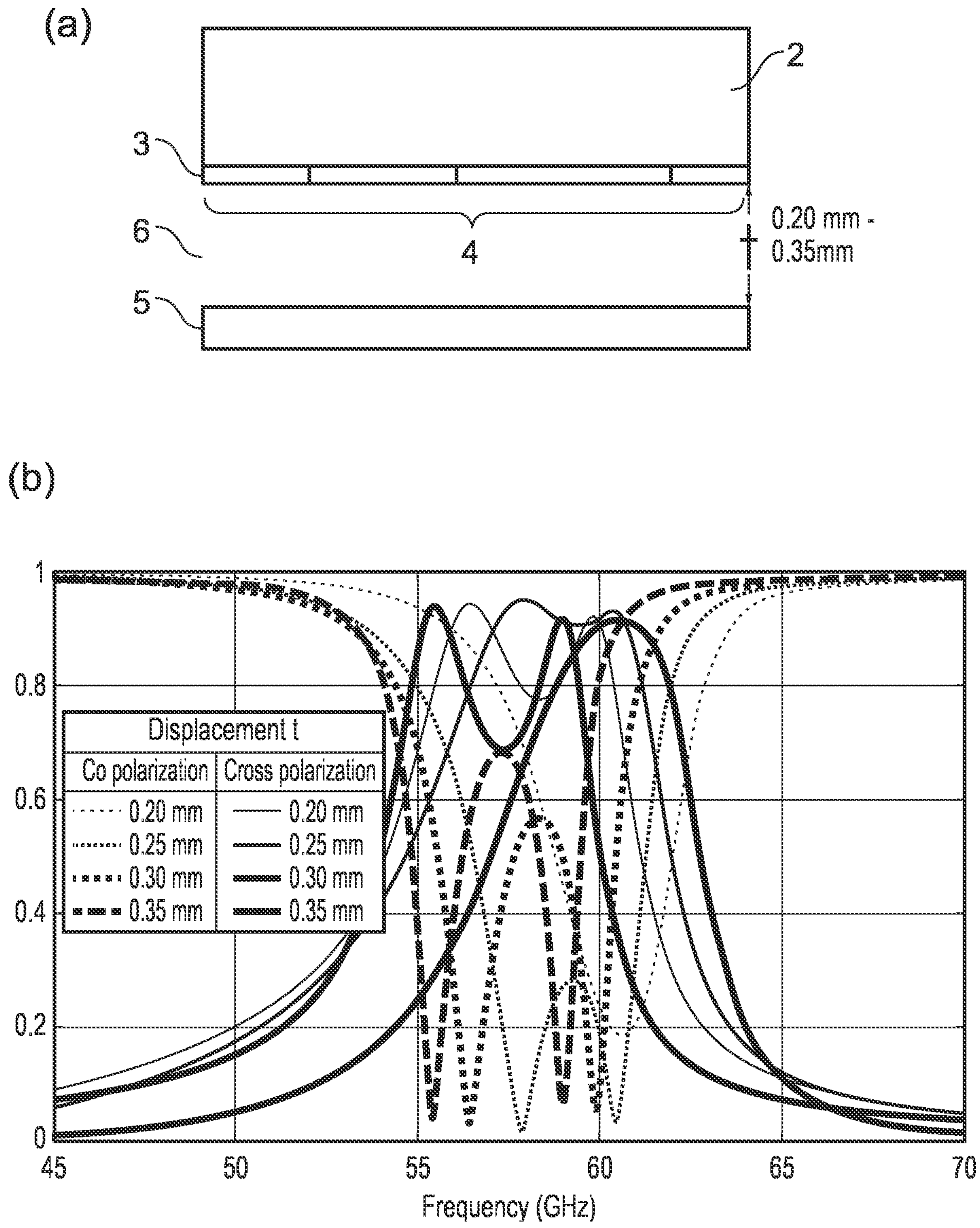
FIG. 3 shows how the arrangement of FIG. 2 may be used to obtain a polarization twist.
Figure 3:
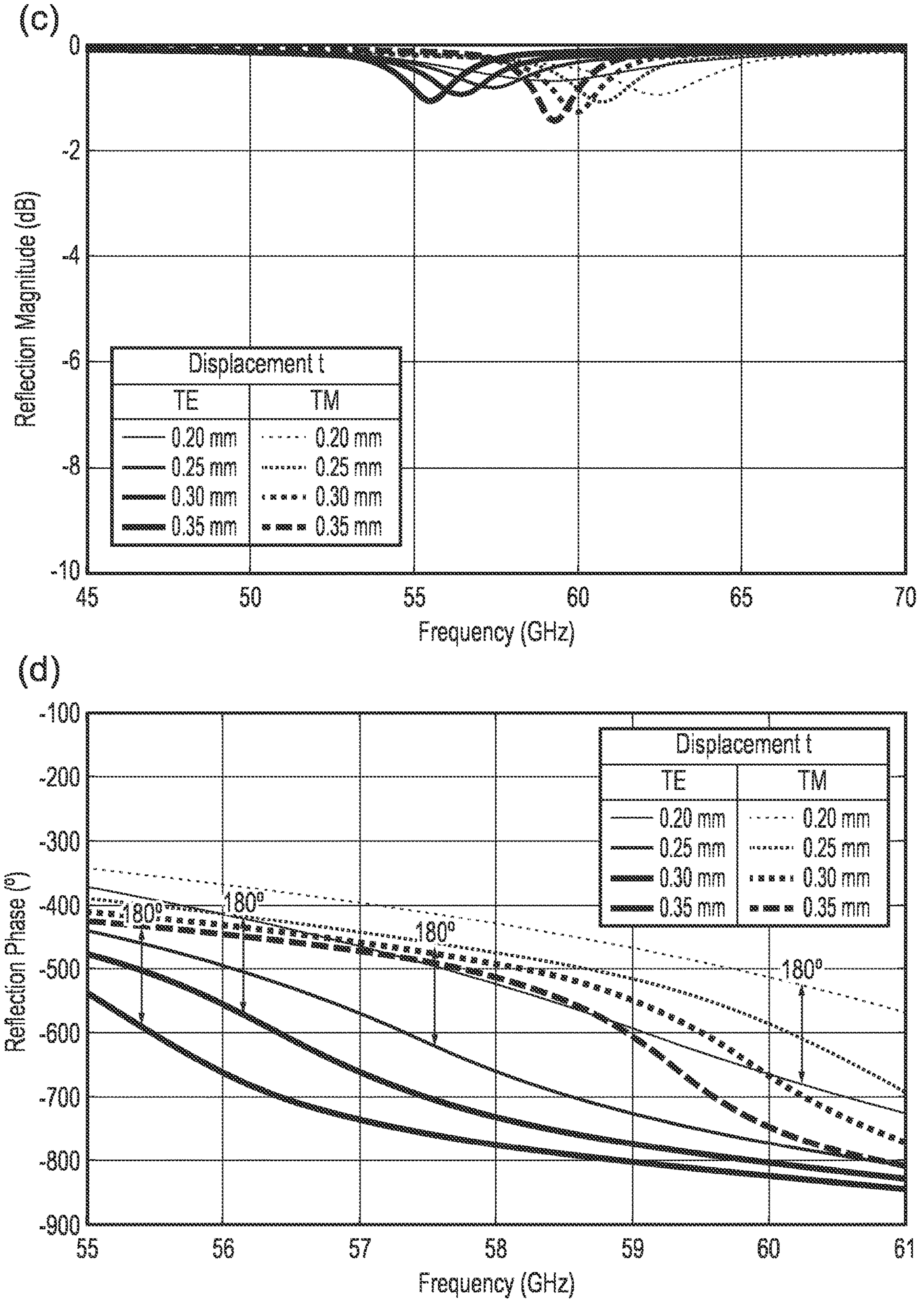

FIG. 3(*a*) shows a side view of a unit cell 4, comprising the dielectric substrate 2, the conductive elements 3', 3" and the ground plane 5. The thickness t of the air gap 6 is variable between 0.20 mm and 0.35 mm. FIG. 3(*b*) shows simulation results of co- and cross-polarization due to the unit cell 4 by varying the parameter t, indicating a polarization twist for an incident electromagnetic wave with ξ=45° with respect the y-axis. FIG. 3(*c*) shows simulation results of TE and TM incidence of reflection magnitude while varying the parameter t. FIG. 3(*d*) shows simulation results of TE and TM incidence of reflection phase while varying the parameter t, verifying the polarization twist.

The simulated results suggest that there is a phase shift of 90° for an operating range from 55 GHz to 61.5 GHz. The operating range was determined for a movement of the ground plane 5 to vary the thickness t of the air gap 6 in a range from 0.2 mm to 0.35 mm. This movement is substantially continuous, dynamic and with enough precision due to the capabilities of the piezoelectric actuator 7 mechanism that holds and moves the ground plane 5. The structure losses as shown by the separate simulations of the two components of the incident electromagnetic wave are low and notably below 1.5 dB across the whole operating range. The minimum operating bandwidth for twisting the polarization for all the ground plane positions is 1 GHz.

Right Handed Circular Polarization Conversion:

A second study was conducted in relation to whether the structure could convert linear polarization to clockwise circular polarization. The criteria for the incident electromagnetic wave with an angle of inclination ξ=45° with respect to the y-axis to be reflected having clockwise circular polarization are: a) the orthogonal components must have a phase difference of 90°; and b) any losses should be low and apply equally to both orthogonal components. The axial ratio of the structure was calculated from the simulation results obtained for the two orthogonal components of the incident electromagnetic field. It is considered that circular polarization is reflected at an angle ξ=45° to the plane xy. The clockwise circular polarization as suggested by the simulations is observed for a distance between the two dimensional array of conductive elements 3 and the ground plane 5 in a range of about 0.16 mm to 0.30 mm. The results of the simulation are presented in FIGS. 4(*a*) to 4(*d*), where based on the simulations it can be seen that conversion from linear polarization to clockwise circular polarization is obtained at exceptional levels for any application.

Figure 4:
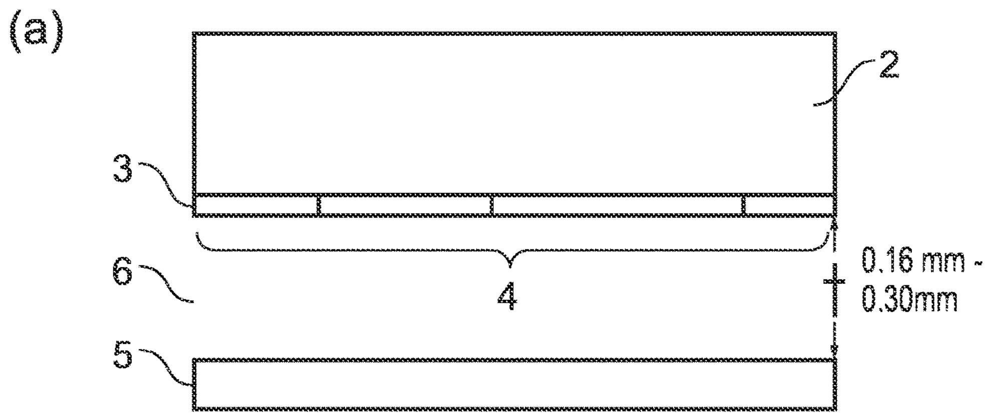
FIG. 4 shows how the arrangement of FIG. 2 may be used to convert linear polarization to right handed circular polarization.
Figure 4:
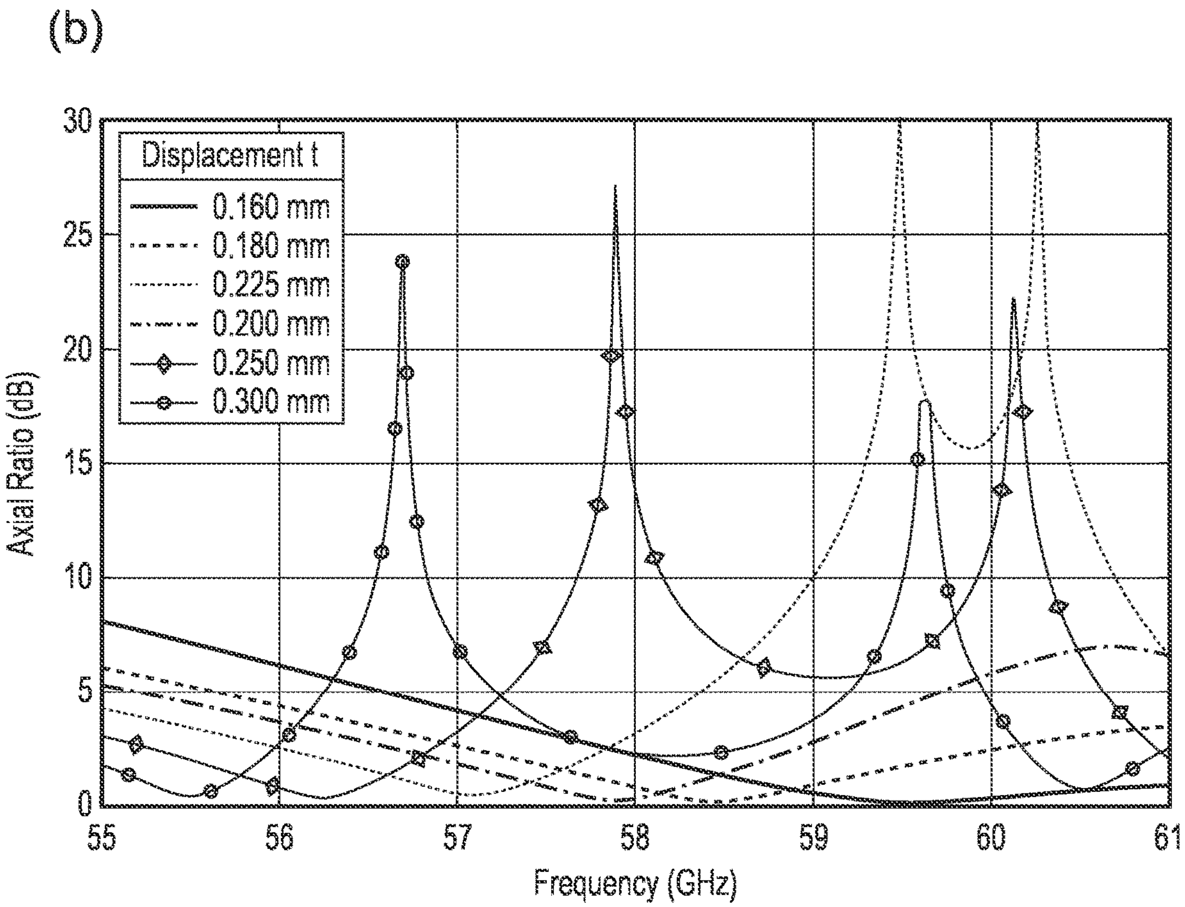
Figure 4:
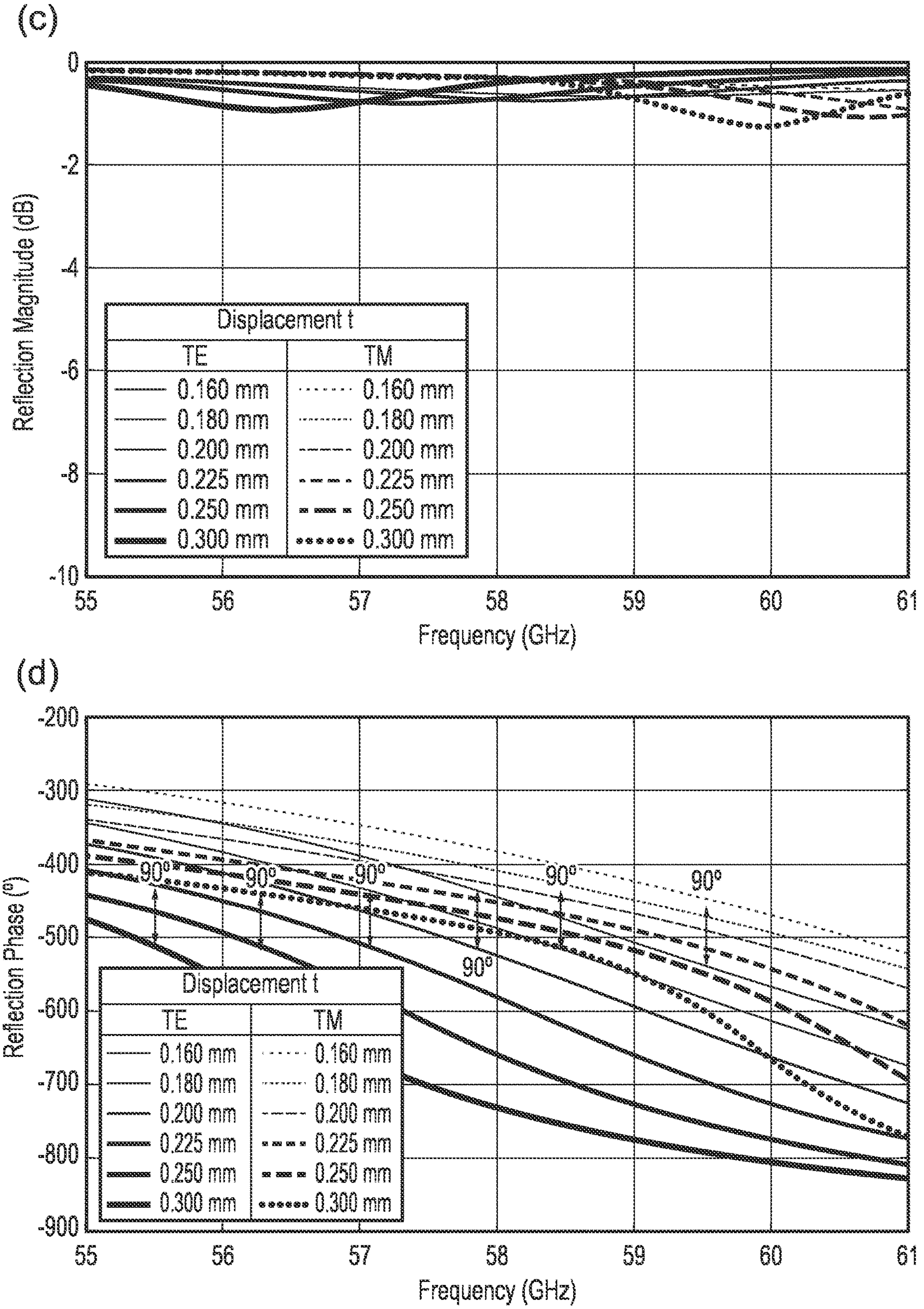

FIG. 4(*a*) shows a side view of a unit cell 4, comprising the dielectric substrate 2, the conductive elements 3', 3" and the ground plane 5. The thickness t of the air gap 6 is variable between 0.16 mm and 0.30 mm. FIG. 4(*b*) shows simulation results of the axial ratio of the unit cell 4 by varying the parameter t, indicating right handed circular polarization conversion, for an incident electromagnetic wave with ξ=45° with respect the y-axis. FIG. 4(*c*) shows simulation results of TE and TM incidence of reflection magnitude while varying the parameter t. FIG. 4(*d*) shows simulation results of TE and TM incidence of reflection phase while varying the parameter t, verifying the direction of circular polarization.

Based on the simulated results, it can be seen that, for electromagnetic wave propagation with linear polarization, conversion of the linear polarization to clockwise (right handed) circular polarization can be achieved across an operating range from 55 GHz to 61 GHz. Throughout the operating range the axial ratio remains below 0.5 dB, showing remarkable performance. FIGS. 4(*c*) and 4(*d*) show that the reflected components of the incident electromagnetic wave meet the requirements for right handed circular polarization. Accordingly, throughout the operating range, the necessary phase difference of 90° between the two components is maintained, and losses are kept at a very low level and apply equally to both components.

Left Handed Circular Polarization Conversion:

A third study was conducted in relation to conversion of linear polarization to counter-clockwise (left handed) circular polarization. The criteria for the incident electromagnetic wave with an angle of inclination ξ=45° with respect to the y-axis to be reflected having clockwise circular polarization are: a) the orthogonal components must have a phase difference of 270°; and b) any losses should be low and apply equally to both orthogonal components. Following the previous study, the axial ratio was calculated in the same way, which is from the simulated results of the two orthogonal components of the impinging electromagnetic wave. The counter-clockwise circular polarization as suggested by the simulations is observed for a distance between the two dimensional array of conductive elements 3 and the ground plane 5 in a range of about 0.32 mm to 0.44 mm. The simulation results are shown in FIGS. 5(*a*) to 5(*d*).

Figure 5:
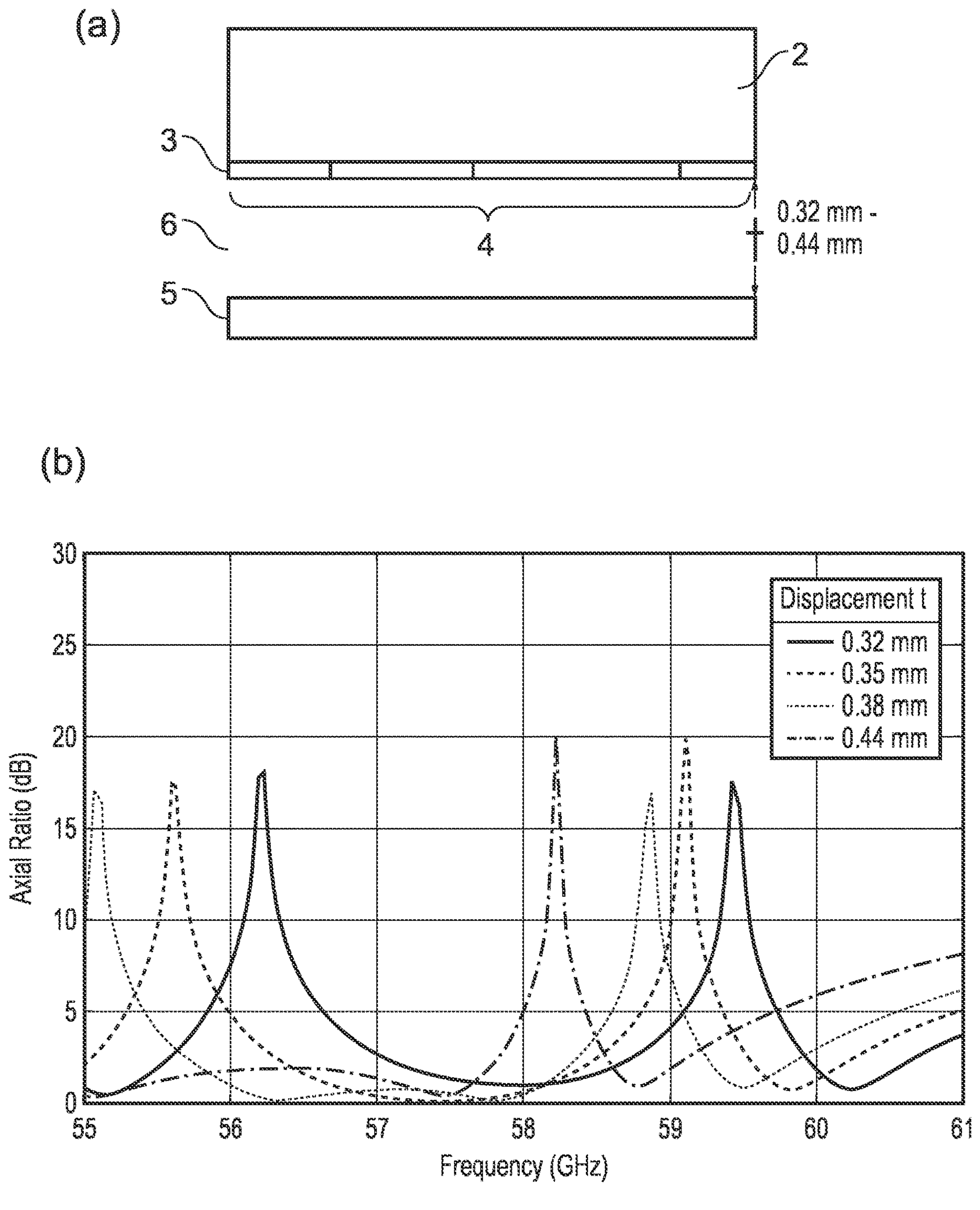
FIG. 5 shows how the arrangement of FIG. 2 may be used to convert linear polarization to left handed circular polarization.
Figure 5:
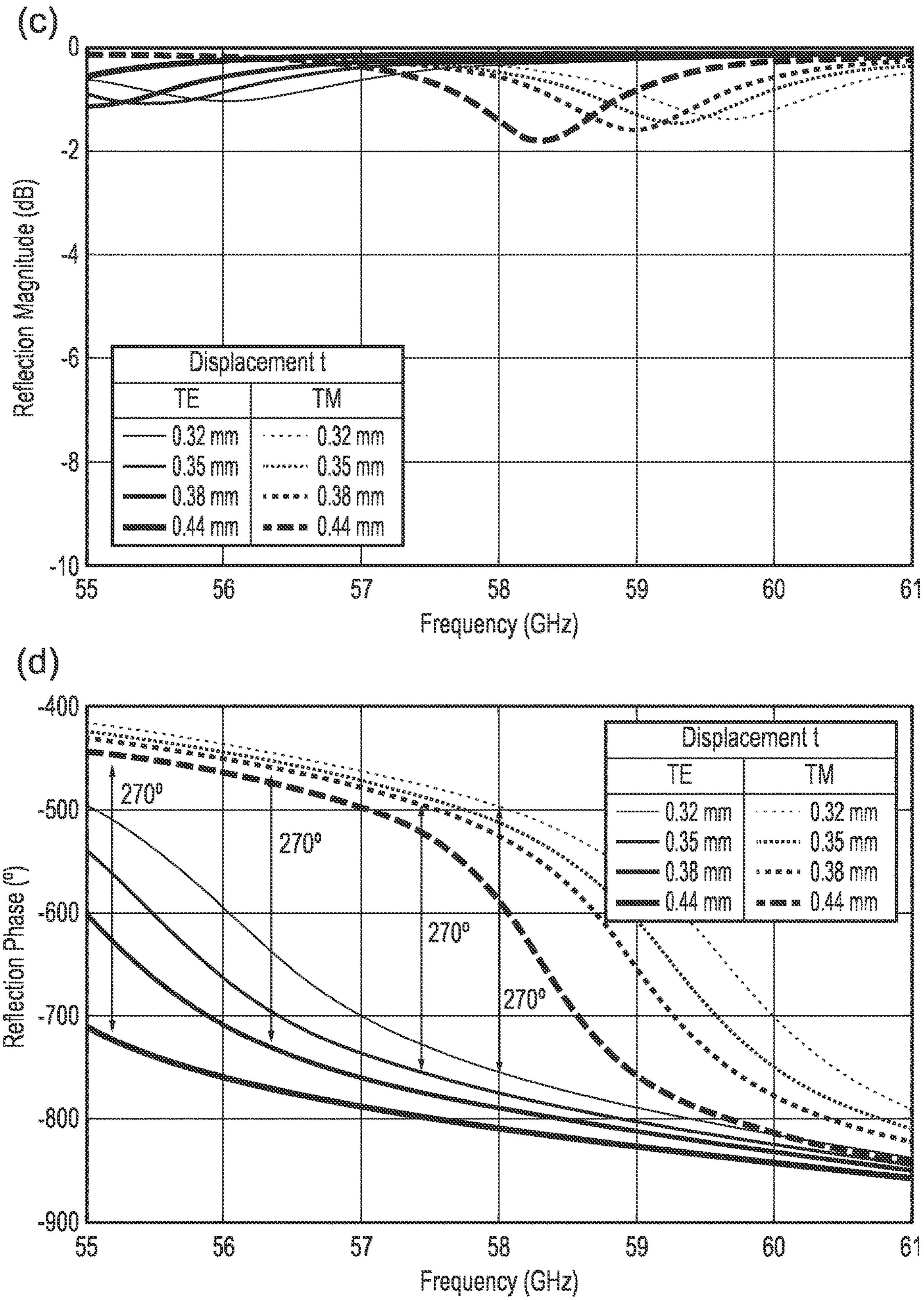

FIG. 5(*a*) shows a side view of a unit cell 4, comprising the dielectric substrate 2, the conductive elements 3', 3" and the ground plane 5. The thickness t of the air gap 6 is variable between 0.32 mm and 0.44 mm. FIG. 5(*b*) shows simulation results of the axial ratio of the unit cell 4 by varying the parameter t, indicating left handed circular polarization conversion, for an incident electromagnetic wave with ξ=45° with respect the y-axis. FIG. 5(*c*) shows simulation results of TE and TM incidence of reflection magnitude while varying the parameter t. FIG. 5(*d*) shows simulation results of TE and TM incidence of reflection phase while varying the parameter t, verifying the direction of circular polarization.

Based on the simulated results, it can be seen that, for electromagnetic wave propagation with linear polarization, conversion of the linear polarization to counter-clockwise (left handed) circular polarization can be achieved across an operating range for from 55 GHz to 59 GHz at a 3 dB axial ratio. Should operation below a 0.5 dB axial ratio be desired, then the operating range is from 55 GHz to 58 GHz. FIGS. 5(*c*) and 5(*d*) show that the reflected components of the incident electromagnetic wave meet the requirements for left handed circular polarization. Accordingly, throughout the operating range, the necessary phase difference of 270° between the two components is maintained, and losses are kept at a very low level and apply equally to both components.

Preservation of Linear Polarization:

A fourth study was conducted to determine whether the structure is able to maintain a given linear polarization. In some applications, polarization alternation is important, and special attention has to be paid as to whether the structure can maintain linear polarization. The challenge lies in the nature of the structure, which has been designed to convert a given polarization into different polarizations and not to maintain the polarization. It is possible to maintain a given polarization by eliminating the air gap 6, for example by raising the ground plane 5 by the piezoelectric actuator 7 until the ground plane 5 contacts the two dimensional array of conductive elements 3. When this is done, an incident electromagnetic wave will simply be reflected off the ground plane 5 metal surface with minimal losses while maintaining its polarization, as it would on any other flat metal surface.

Figure 6:
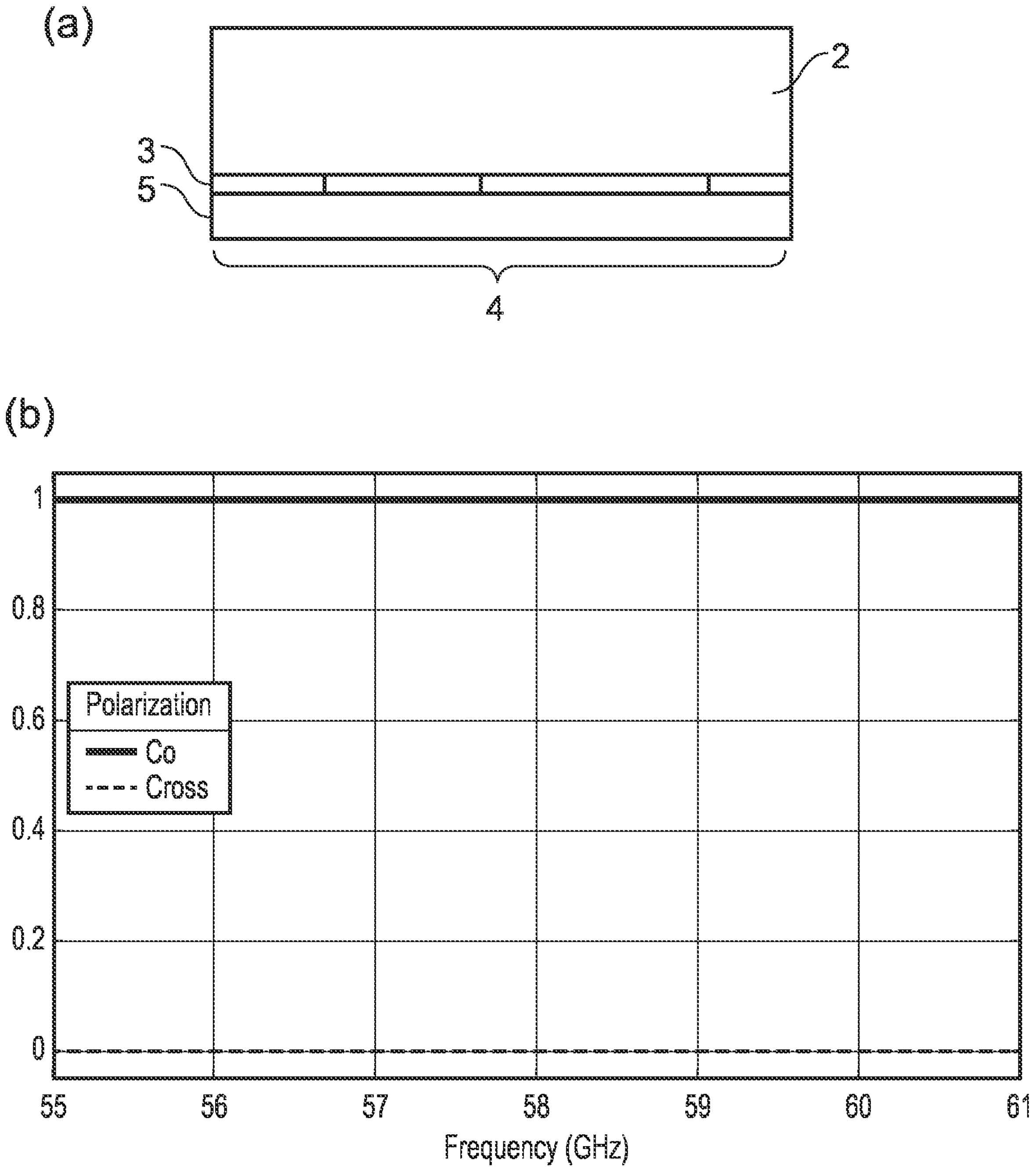
FIG. 6 shows how the arrangement of FIG. 2 may be used to preserve linear polarization.

This can be seen in FIGS. 6(*a*) and 6(*b*). FIG. 6(*a*) is a side view of a unit cell 4, comprising the dielectric substrate 2, the conductive elements 3', 3" and the ground plane 5. There is no air gap between the ground plane 5 and the conductive elements 3', 3", and the ground plane 5 contacts the conductive elements 3', 3". FIG. 6(*b*) shows the simulation results for co- and cross-polarization due to the unit cell 4, indicating the preservation of linear polarization for an incident electromagnetic wave with (=45° with respect to the y-axis.

The structure can maintain linear polarization with almost zero losses from 55 GHz to 61 GHz with the elimination of the air gap 6 as shown in FIG. 6(*b*).

Figure 7:
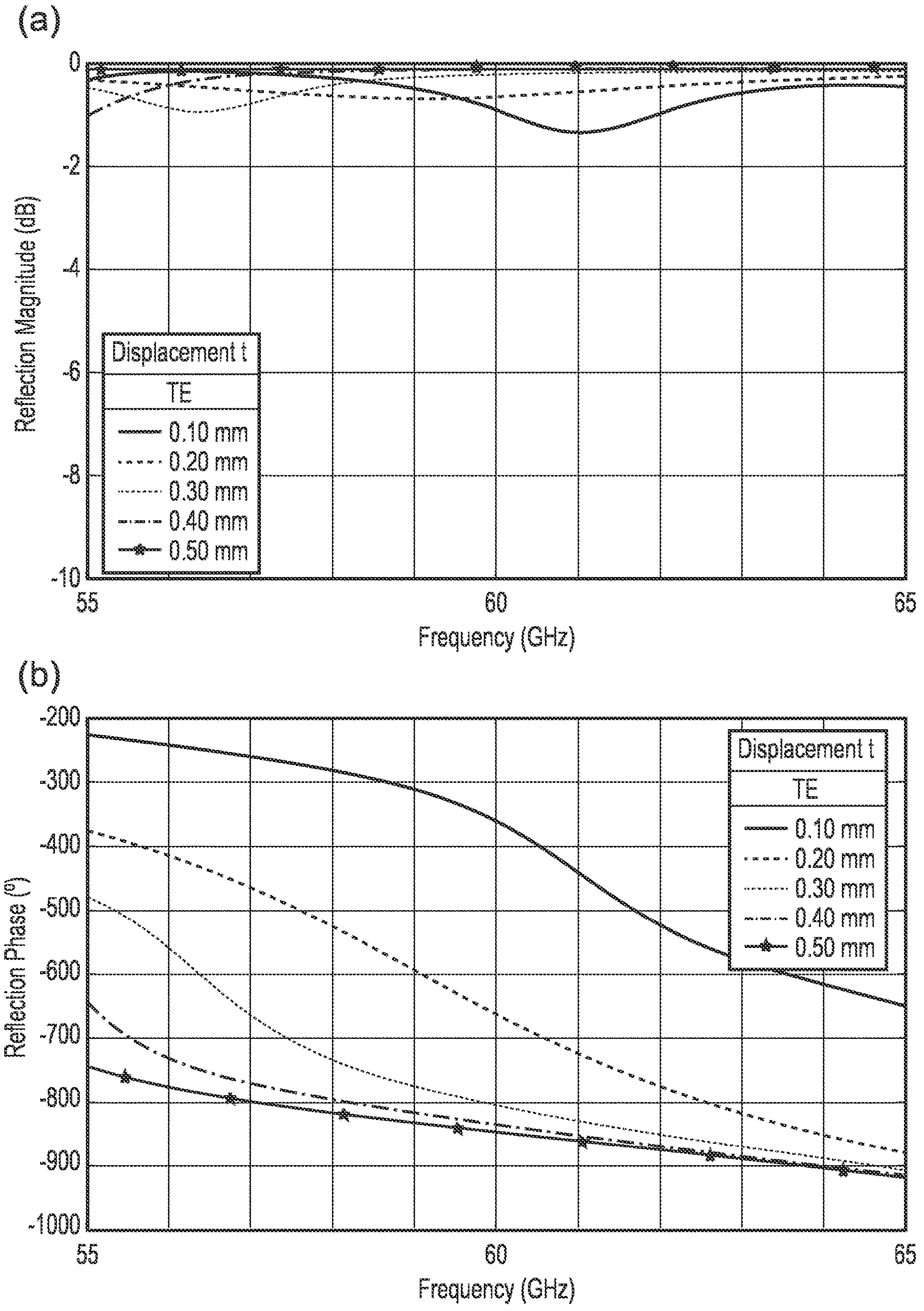
FIG. 7 shows how the arrangement of FIG. 2 may be used for phase shifting.
Figure 7:
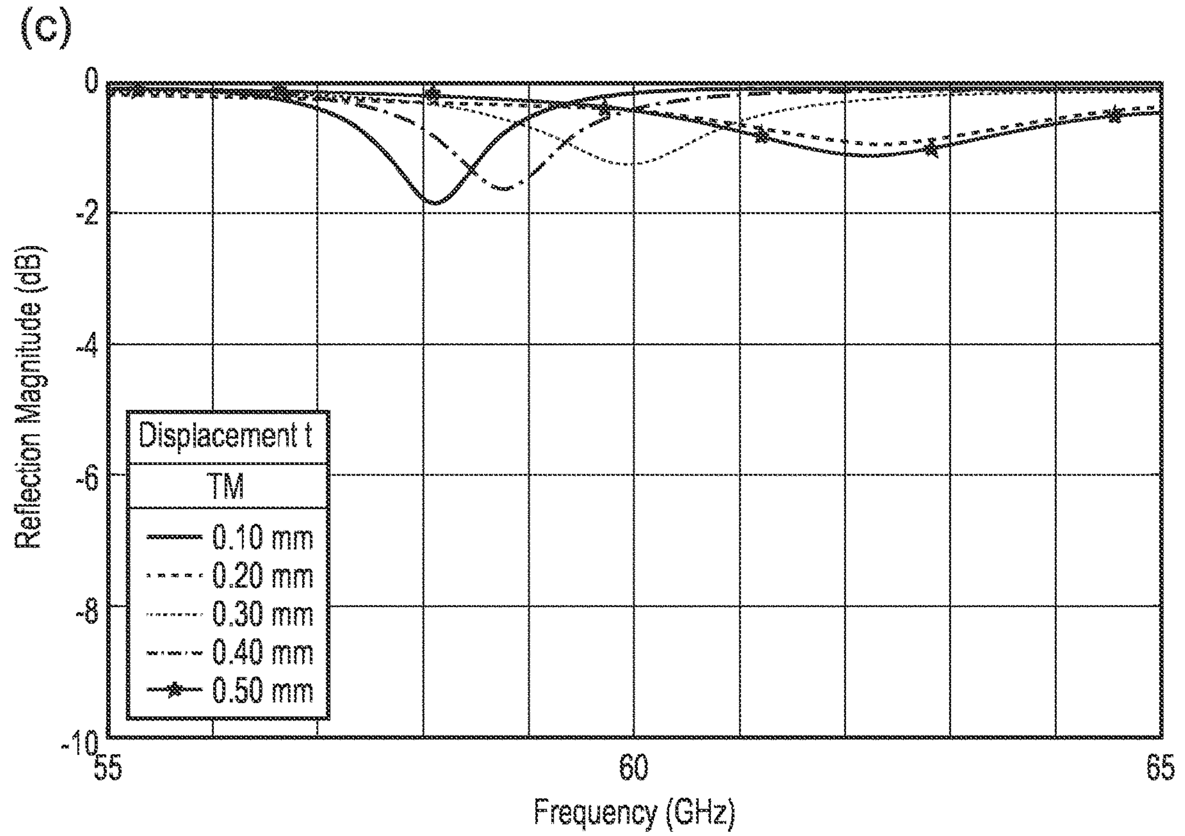
Figure 7:
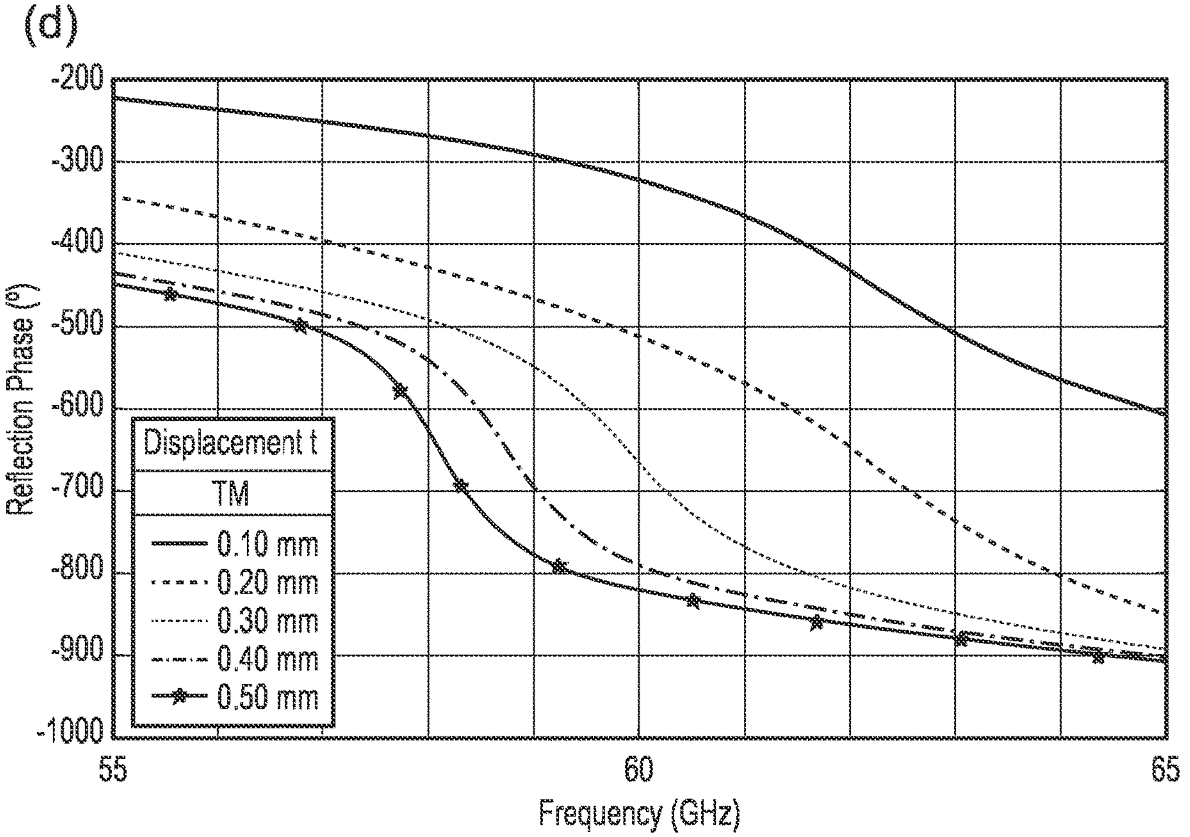

Phase Shifting:

A fifth study was conducted to observe the maximum phase shift of an incident electromagnetic wave in the TE and TM modes, and the results are presented in FIGS. 7(*a*) to 7(*d*).

FIG. 7(*a*) shows simulation results for the reflection magnitude of the TE mode across a frequency range of 55 GHz to 65 GHz for various air gap 6 thicknesses t. FIG. 7(*b*) shows simulation results for the reflection phase of the TE mode across a frequency range of 55 GHz to 65 GHz for various air gap 6 thicknesses t. FIG. 7(*c*) shows simulation results for the reflection magnitude of the TM mode across a frequency range of 55 GHz to 65 GHz for various air gap 6 thicknesses t. FIG. 7(*d*) shows simulation results for the reflection phase of the TM mode across a frequency range of 55 GHz to 65 GHz for various air gap 6 thicknesses t.

It will be noted that for a vertical inclination of the angle of incidence, with $\xi=0°$ with respect to the y-axis, the structure can cause a phase shift of more than 360° for both TE and TM modes by varying the thickness t of the air gap 6 between 0.10 mm and 0.50 mm.

Fabricated Prototype:

A prototype metasurface 1 was fabricated by printing a two dimensional array of first and second "+" shaped conductive elements 3, 3" on a dielectric substrate 2. A conductive ground plane 5 was positioned at a distance t from the two dimensional array so as to define a cavity or air gap 6. In this arrangement, the dielectric substrate 2 is not included in the cavity to minimize reflective losses and maximize the effect of cavity or air gap 6 thickness t change. A piezoelectric actuator 7 was attached below the ground plane 5, thus allowing the air gap 6 or cavity thickness t to be varied, which in turn allows polarization to be controlled. A Nelco dielectric substrate 2 with a thickness of 0.78 mm was used, with the two-dimensional array of conductive elements 3, 3" extending across an area of 100 $mm^2$. This corresponds to approximately $10\lambda\times10\lambda$ for the lowest operating frequency.

The piezoelectric actuator 7 was configured so that, when no biasing DC voltage was applied, the conductive ground plane 5 contacted the two dimensional array of conductive elements 3, 3". Due to the thickness of the conductive elements 3, 3" themselves, the separation between the ground plane 5 and the underside of the metasurface 1 varied between 0 mm and 0.1 mm. Upon applying a biasing DC voltage to the piezoelectric actuator 7, the ground plane 5 could be separated from the two dimensional array of conductive elements 3, 3" so as to define an air gap 6 or cavity of adjustable thickness t. Applying a biasing DC voltage of up to 120V to piezoelectric actuator 7 allowed the ground plane 5 to be displaced away from the underside of the metasurface 1 by up to 0.50 mm.

The reflection characteristics for the TE and TM modes were measured for various applied DC biasing voltages corresponding to various spacings of the ground plane 5 from the two dimensional array of conductive elements 3', 3".

Figure 8:
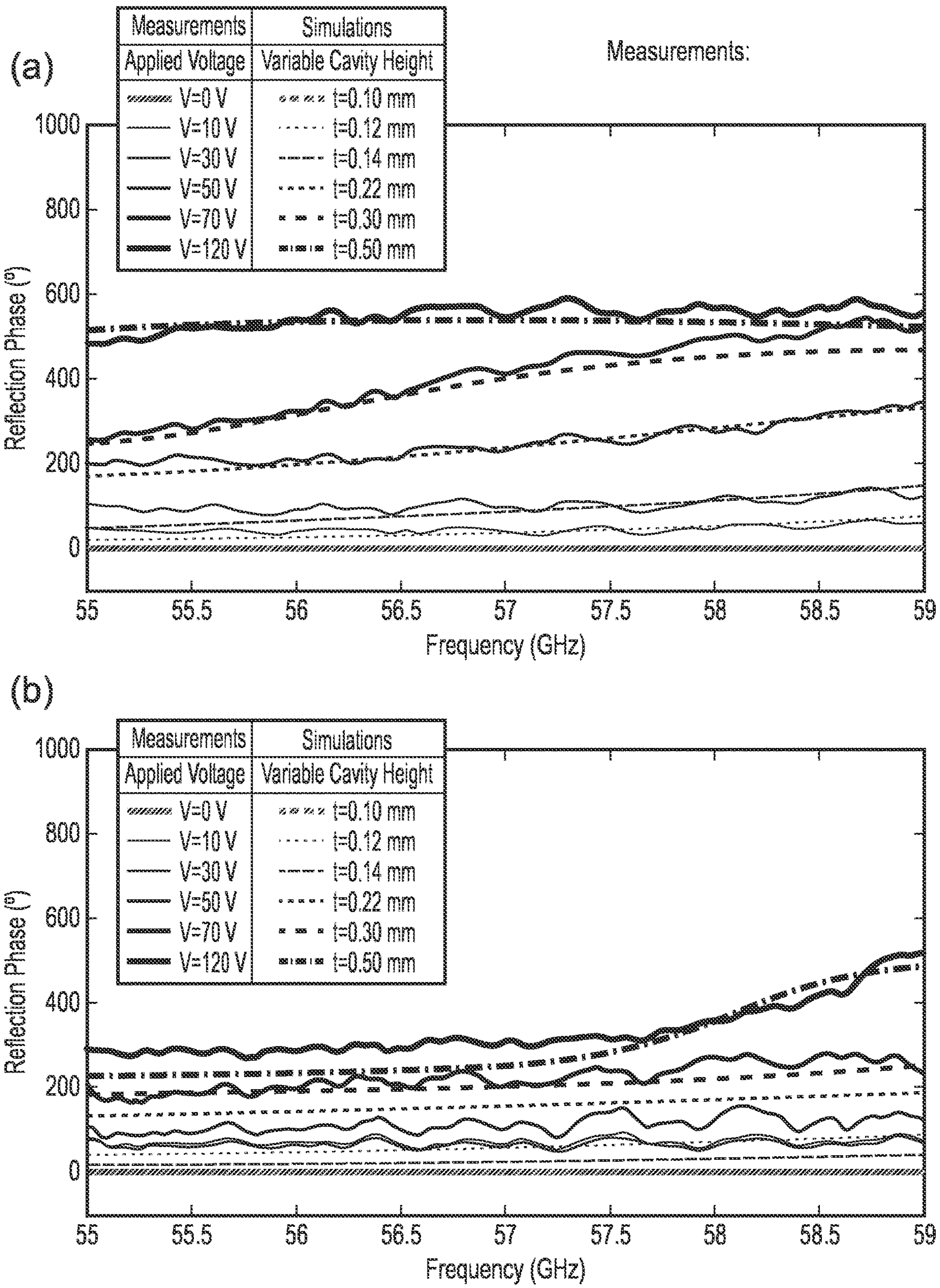
FIG. 8 shows measured phase reflectance results for different applied voltages for TE mode incidence and TM mode incidence.

FIG. 8 shows the measured phase reflectance results for different applied voltages, with FIG. 8(*a*) showing the TE mode incidence and FIG. 8(*b*) showing the TM mode incidence.

Figure 9:
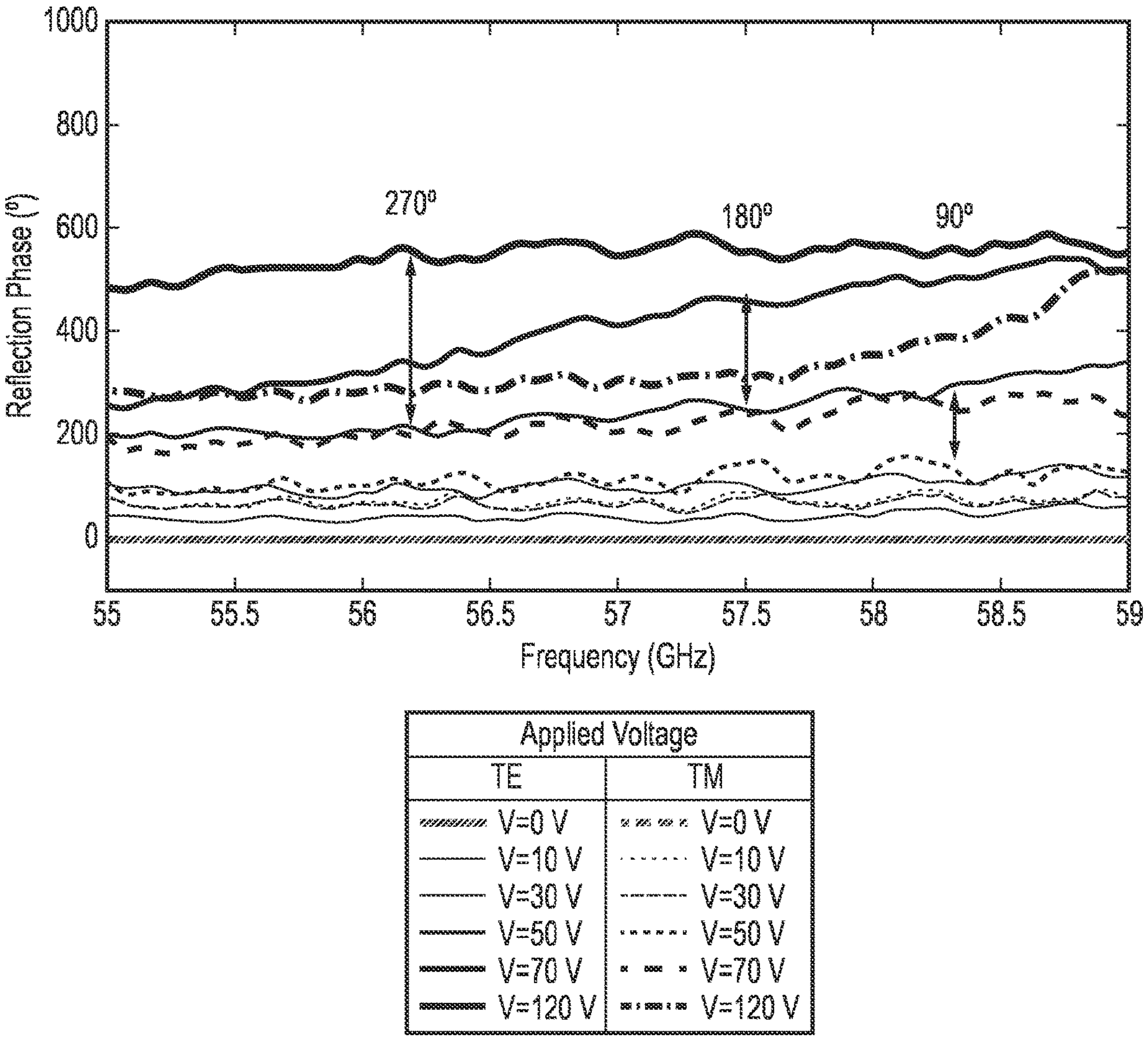
FIG. 9 shows the results of FIG. 8 plotted together.

FIG. 9 shows the measured phase reflectance results on the same plot, highlighting some examples of the phase difference between the TE mode and the TM mode, which can produce the different effects set out above.

Figure 10:
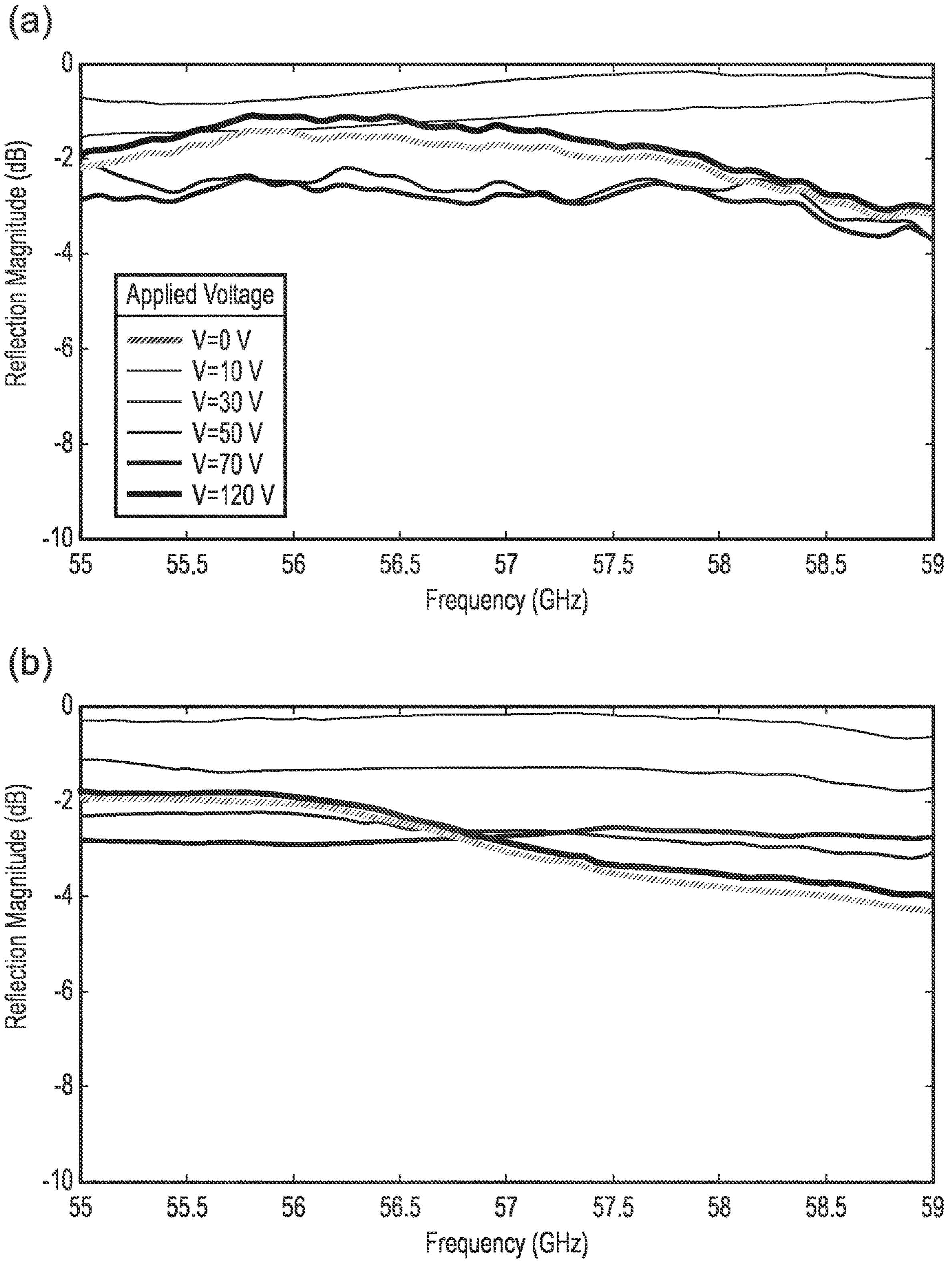
FIG. 10 shows normalised reflection magnitude results for different applied voltages for TE mode and TM mode.

FIG. 10 shows the normalised reflection magnitudes for different applied voltages, with FIG. 10(*a*) showing the TE mode magnitudes and FIG. 10(*b*) showing the TM mode magnitudes. FIG. 10 shows an indication of the normalized losses of the structure at the respective voltage values.

Techniques that enable the tunability of metasurfaces offer extended capabilities in the manipulation of the spectral and spatial properties of electromagnetic waves. Polarization control for a variety of applications is extremely important, especially in cases such as satellite systems where polarization rotation is necessary for the best possible communication. A small profile structure which has full control of polarization may significantly reduce costs and enhance communication flexibility. The conversion to and between different types of polarization, the speed of conversion, and low losses make the proposed structure an excellent alternative for systems that require each type of electromagnetic wave polarization. An important role in the operation of embodiments of the disclosure is played by the micro-actuator mechanism 7 which may be positioned below the ground plane 5. This mechanism enables control of the displacement of the ground plane 5, in some cases with an accuracy of 1 μm, and in some cases with a position shift within 3 milliseconds. This results in dynamic and continuous polarization control of the reflected electromagnetic wave. Additionally, the micro-actuator mechanism 7, unlike other tuning devices, is placed below the ground plane 5, thus keeping losses very low. Certain embodiments may be scalable from mm-wave frequencies up to the THz regime and in some cases beyond into the infrared spectrum.

Embodiments of the disclosure have been shown to allow conversion between different polarizations as well as maintenance of linear polarization across an operating range of all polarizations from 55 GHz to 59 GHz. The range is currently limited because the results for conversion from linear to counter-clockwise circular polarization are not as good as the other conversions in the range from 59 GHz to 61 GHz. Losses across the entire operating range and for all different polarizations are kept below 1.5 dB at the simulation level. The structure operates within the mm-wave band where it is traditionally difficult to achieve a good low-loss performance.

Table 1 below presents a summary of a multi-function piezoelectric actuated metasurface of embodiments of the present disclosure, highlighting the polarization state, the required air gap thickness t, the conversion rate, the axial ratio and the operating frequency.

TABLE 1

| Polarization State | Displacement (mm) | Conversion Rate | Axial Ratio (dB) | Tuning frequency range (GHz) |
|---|---|---|---|---|
| Polarization Twist | 0.20-0.35 | <90% | — | 55-61 |
| RHCP | 0.16-0.30 | — | 0.5 | 55-61 |
| LHCP | 0.32-0.44 | — | 0.5 | 55-59 |
| Polarization Preservation | 0.00 | 100% | — | 55-61 |

For each different polarization, the ground plane 5 is placed at a different displacement for a given frequency. In the fabricated prototype, the spacing of the ground plane 5 from the two-dimensional array of conductive elements 3', 3" can be from 0.06 mm to 0.44 mm. This is obtained by varying an applied DC biasing voltage on the piezoelectric actuator 7 from 12V to 112V. The displacement of the ground plane 5 caused by the piezoelectric actuator 7 is substantially continuous with the change in applied voltage, but can suffer from hysteresis effects. In order to avoid or mitigate against this effect, a unidirectional application of DC biasing voltage after initial calibration may be performed. There are commercially available closed-loop feedback controls which can help to reduce or eliminate this hysteresis effect. The piezoelectric actuator 7 may have integrated strain gauges to enable this, and commercial control circuitry is readily available. Compared to other mechanisms that can provide mechanical micro-movement, piezoelectric mechanisms are superior when it comes to the speed of position variation. Other mechanisms that have been considered for mechanical displacement are: solenoids, small motors and other magnet-based devices. The displacement speed of the piezoelectric mechanism depends on the weight of its load, and is usually of the order of milliseconds. It has been observed by the present inventors that, when the load (i.e. the mass of the ground plane 5) is no more than 70 g, the piezoelectric actuator 7 can displace the ground plane 5 to a new position within 3 ms.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A reconfigurable metasurface device comprising:

a planar dielectric substrate and a two dimensional array of substantially planar conductive elements formed on or in the planar dielectric substrate, wherein the two dimensional array of substantially planar conductive elements consists of alternating rows and columns of first and second substantially planar conductive elements, the first conductive elements each having a first shape with a first width and height, and the second conductive elements each having a second shape with a second width and height, the alternating rows and columns being offset with respect to each other such that centroids of the first shapes are disposed centrally between centroids of the second shapes of each adjacent row, and centroids of the first shapes of one column are disposed centrally between centroids of the second shapes in each adjacent column and where the centroids of the respective first and second shapes are arranged in a substantially isosceles triangular lattice array pattern;

a conductive ground plane disposed adjacent and substantially parallel to the two dimensional array of conductive elements so as to define an air gap between the two dimensional array of conductive elements and the conductive ground plane; and a micro-actuator configured to adjust or vary a thickness of the air gap.

2. The device as claimed in claim 1, wherein the micro-actuator is configured to vary the thickness of the air gap by moving the conductive ground plane relative to the metasurface.

3. The device as claimed in claim 2, wherein the micro-actuator is disposed on or connected to a surface of the conductive ground plane facing away from the metasurface.

4. The device as claimed in claim 1, wherein the micro-actuator is a piezoelectric actuator.

5. The device as claimed in claim 1, configured to reflect an incident electromagnetic wave and to control a phase shift in the reflected electromagnetic wave by adjusting or varying the thickness of the air gap.

6. The device as claimed in claim 1, configured to reflect an incident electromagnetic wave and to convert a linear polarization of the incident electromagnetic wave to a circular polarisation in the reflected electromagnetic wave by adjusting or varying the thickness of the air gap.

7. The device as claimed in claim 1, configured to reflect an incident electromagnetic wave and to twist a linear polarization of the incident electromagnetic wave to a different linear polarisation in the reflected electromagnetic wave by adjusting or varying the thickness of the air gap.

8. The device as claimed in claim 1, configured to reflect an incident electromagnetic wave and to preserve a polarization of the incident electromagnetic wave in the reflected electromagnetic wave by adjusting the thickness of the air gap to be substantially zero.

9. The device as claimed in claim 1, wherein the first shape is geometrically similar to the second shape.

10. The device as claimed in claim 1, wherein the first shape is geometrically different to the second shape.

11. The device as claimed in claim 1, wherein the first width and height are different to the second width and height.

12. The device as claimed in claim 1, wherein the first width is the same as the first height, and the second width is the same as the second height.

13. The device as claimed in claim 12, wherein the first width and height are of length $h_1$ and the second width and height are of length $h_2$, and wherein $h_1>h_2$.

14. The device as claimed in claim 1, wherein a unit cell of the triangular lattice array pattern has a centroid of a first conductive element as an apex, and centroids of the two closest, in an adjacent row or column, second conductive elements as first and second base vertices.

15. The device as claimed in claim 14, wherein the unit cell of the triangular lattice array pattern is an isosceles triangle with an obtuse apex angle.

16. The device as claimed in claim 1, wherein the first and/or second shapes are polygons.

17. The device as claimed in claim 1, wherein the first and/or second shapes are cross shapes.

18. The device as claimed in claim 1, wherein the first and/or second shapes are "+" shapes.

* * * * *